US009261946B2

(12) United States Patent
Sardashti et al.

(10) Patent No.: US 9,261,946 B2
(45) Date of Patent: Feb. 16, 2016

(54) ENERGY OPTIMIZED CACHE MEMORY ARCHITECTURE EXPLOITING SPATIAL LOCALITY

(71) Applicant: Wisconsin Alumni Research Foundation, Madison, WI (US)

(72) Inventors: Somayeh Sardashti, Madison, WI (US); David A. Wood, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 644 days.

(21) Appl. No.: 13/649,840

(22) Filed: Oct. 11, 2012

(65) Prior Publication Data

US 2014/0108731 A1 Apr. 17, 2014

(51) Int. Cl.

| | |
|---|---|
| ***G06F 12/00*** | (2006.01) |
| ***G06F 1/32*** | (2006.01) |
| ***G06F 12/02*** | (2006.01) |
| ***G06F 12/08*** | (2006.01) |

(52) U.S. Cl.

CPC ............ *G06F 1/3275* (2013.01); *G06F 1/3225* (2013.01); *G06F 12/0223* (2013.01); *G06F 12/0246* (2013.01); *G06F 12/0895* (2013.01); *Y02B 60/1228* (2013.01)

(58) Field of Classification Search

CPC ............ G06F 12/0223; G06F 12/0692; G06F 12/0815; G06F 12/0246

USPC .......................................................... 711/122

See application file for complete search history.

(56) References Cited

U.S. PATENT DOCUMENTS

| | | | | |
|---|---|---|---|---|
| 6,640,283 | B2 | 10/2003 | Naffziger et al. | |
| 7,412,564 | B2 | 8/2008 | Wood et al. | |
| 2002/0042862 | A1 * | 4/2002 | Breternitz et al. | 711/125 |
| 2003/0135694 | A1 * | 7/2003 | Naffziger et al. | 711/118 |
| 2005/0071562 | A1 * | 3/2005 | Adl-Tabatabai et al. | 711/118 |
| 2005/0114601 | A1 * | 5/2005 | Ramakrishnan | G06F 12/0802 711/118 |
| 2006/0047916 | A1 * | 3/2006 | Ying et al. | G06F 12/0802 711/144 |

OTHER PUBLICATIONS

A. Alameldeen and D. Wood, Adaptive Cache Compression for High-Performance Processors, Proceedings of the 31st Annual International Symposium on Computer Architecture, 2004.

A. Seznec. Decoupled sectored caches: Conciliating low tag implementation cost and low miss ratio, In Proc. Intl' Symposium on Computer Architecture, 1994.

(Continued)

*Primary Examiner* — Prasith Thammavong

(74) *Attorney, Agent, or Firm* — Boyle Fredrickson, S.C.

(57) ABSTRACT

Aspects of the present invention provide a "SuperTag" cache that manages cache at three granularities: (i) coarse grain, multi-block "super blocks," (ii) single cache blocks and (iii) fine grain, fractional block "data segments." Since contiguous blocks have the same tag address, by tracking multi-block super blocks, the SuperTag cache inherently increases per-block tag space, allowing higher compressibility without incurring high area overheads. To improve compression ratio, the SuperTag cache uses variable-packing compression allowing variable-size compressed blocks without requiring costly compactions. The SuperTag cache also stores data segments dynamically. In addition, the SuperTag cache is able to further improve the compression ratio by co-compressing contiguous blocks. As a result, the Super Tag cache improves energy and performance for memory intensive applications over conventional compressed caches.

20 Claims, 5 Drawing Sheets

(56) References Cited

OTHER PUBLICATIONS

J. Zebchuk, E. Safi and A. Moshovos, A Framework for Coarse-Grain Optimizations in the On-Chip Memory Hierarchy, Proceedings of the International Symposium on Microarchitecture, 2007.
N. Kim, T. Austin, and T. Mudge, Low-Energy Data Cache Using Sign Compression and Cache Line Bisection, Second Annual workshop on Memory Performance Issues (WMPI), in conjunction with ISCA-29, 2002.
X. Chen, L. Yang, R. Dick, L. Shang, and H. Lekatsas, C-pack: a high-performance microprocessor cache compression algorithm, IEEE Transactions on VLSI Systems, 2010.
J. Rothman and A. Smith. The Pool of Subsectors Cache Design, In Proc. Int'l Conference on Supercomputing, 1999.
J. Liptay. Structural Aspects of the System/360 Model85 Part II: The Cache, IBM Systems Journal, 1968.
L. Villa, M. Zhang, and K. Asanovic, Dynamic zero compression for cache energy reduction, Proceedings of the 33rd annual ACM/IEEE international symposium on Microarchitecture, 2000.
J. Yang and R. Gupta, Frequent Value Locality and its Applications, ACM Transactions on Embedded Computing Systems, 2002.
E. G. Hallnor and S. K. Reinhardt, A Unified Compressed Memory Hierarchy, Proceedings of the 11th International Symposium on High-Performance Computer Architecture (HPCA), 2005.
J. S. Lee, W. K. Hong, and S. D. Kim, An on-chip cache compression technique to reduce decompression overhead and design complexity, Journal of Systems Architecture, vol. 46, Dec. 2000.
J. Yang and R. Gupta, Energy Efficient Frequent Value Data Cache Design, Proceedings of the 35th Annual IEEE/ACM International Symposium on Microarchitecture, 2002.
S. Kim, J. Kim, J. Lee and S. Hong, Residue Cache: A Low-Energy Low-Area L2 Cache Architecture via Compression and Partial.
J. Dusser and A. Seznec, Decoupled Zero-Compressed Memory, In Proceedings of the 6th International Conference on High Performance and Embedded Architectures and Compilers, HiPEAC '11, 2011.
R.B. Tremaine, P.A. Franaszek, J.T. Robinson, C.O. Schulz, T.B. Smith, M.E. Wazlowski, and P.M. Bland, IBM Memory Expansion Technology (MXT), IBM Journal of Research and Development, 45(2):271-285, Mar. 2001.

* cited by examiner

ENERGY OPTIMIZED CACHE MEMORY ARCHITECTURE EXPLOITING SPATIAL LOCALITY

STATEMENT REGARDING FEDERALLY SPONSORED RESEARCH OR DEVELOPMENT

This invention was made with government support under 1218323, 1117280, 1017650, and 0916725 awarded by the National Science Foundation. The government has certain rights in the invention.

BACKGROUND OF THE INVENTION

The present invention relates to the field of computer systems, and in particular, to an energy optimized cache memory architecture exploiting spatial locality.

Improvements in technology scaling continue to bring new power and energy challenges in computer systems as the amount of power consumed per transistor does not scale down as quickly as the total density of transistors. In such systems, a significant amount of energy is consumed by the memory hierarchy which has long focused on improving memory latency and bandwidth by minimizing the gap between processor speeds and memory speeds.

Caches memories, or caches, play a critical role in reducing system energy. A typical cache memory is a fast access memory that stores data reflecting selected locations in a corresponding main memory of the computer system. Caches are usually comprised of Static Random Access Memory ("SRAM") cells. Typically, the data stored in caches is organized into data sets which are commonly referred to as cache lines or cache blocks. Caches usually include storage areas for a set of tags that correspond to each block. Such tags typically include address tags that identify an area of the main memory that maps to the corresponding block. In addition, such cache tags usually provide status information for the corresponding block.

Although caches consume significant power, they can also save system power by filtering, and thereby reducing, costly off-chip accesses to main memory. Consequently, effectively utilizing caches is not only important for system performance, but also for system energy.

Cache compression is a known technique for increasing the effective cache capacity by compressing and compacting data, which reduces cache misses. Cache compression can also improve cache power by reading and writing less data for each cache access. Cache compression techniques may include targeting limited data patterns, such as dynamic zero compression and significance compression, to alternatives targeting more complex patterns. The "C-PACK" (Cache Packer) algorithm, for example, as described in "C-pack: a high-performance microprocessor cache compression algorithm," IEEE Transactions on VLSI Systems, 2010 by X. Chen, L. Yang, R. Dick, L. Shang and H. Lekatsas, the contents of which is hereby expressly incorporated by reference, applies a pattern-based partial dictionary match compression technique with fixed packing, and uses a pair matching technique to locate cache blocks with sufficient unused space for newly allocate blocks, thereby offering a compression technique with lower hardware overhead. In general, cache compression can improve system energy if its energy overheads due to compressing and packing cache blocks are lower than the energy it saves by reducing accesses to the next level of memory in the memory hierarchy, such as to main memory.

However, existing cache compression techniques limit the effectiveness in optimizing system energy by lowering compressibility and incurring high energy overheads. Conventional compressed caches typically have three main drawbacks. First, to fit more cache blocks, conventional compressed caches typically double the tag array size, and as such, can only typically double the effective cache capacity. Second, packing more cache blocks often results in higher energy overheads. Variable packing techniques, which compress cache blocks into variable, sizes, improve compressibility, but incur higher energy overheads. These techniques need to frequently compact invalid cache blocks to make contiguous free space, called compaction or repacking, and as such, they significantly increase the number of accessed cache blocks. Thus, they remove the potential energy benefits of the compression. Third, conventional compressed caches limit the compression ratio. Several proposals, including those targeting energy-efficiency, use fixed-packing techniques that at most fit two compressed cache blocks in the space of one uncompressed block. In addition, all of the existing cache compression proposals compress small blocks, for example, 64 Bytes, not allowing higher compression ratios made possible by compressing larger blocks of data.

SUMMARY OF THE INVENTION

The present inventors have recognized that several contiguous blocks often co-exist in memory, such as in the last level cache ("LLC"); that contiguous blocks often have a similar compression ratio; and that large block sizes typically offer higher compression ratios. As such, by exploiting spatial locality, compression effectiveness may be maximized, thus optimizing the cache system.

The present inventors propose a compressed cache called "SuperTag" cache that improves compression effectiveness and reduces system energy by exploiting spatial locality. SuperTag cache manages cache, such as the last level cache, at three granularities: (i) coarse grain, multi-block "super blocks," (ii) single cache blocks, and (iii) fine grain, fractional block "data segments." Since contiguous blocks have the same tag address, by tracking multi-block super blocks, the SuperTag cache inherently increases per-block tag space, allowing higher compressibility without incurring high area overheads. A super block may comprise, for example, a group of four aligned contiguous blocks of 64 bytes in size each, for a total 256 Byte super block.

To improve the compression ratio, the SuperTag cache uses a variable-packing compression scheme allowing variable-size compressed blocks without requiring costly compactions. The SuperTag cache then stores compressed data segments, such as data segments of 16 Bytes in size each, dynamically.

In addition, the SuperTag cache is able to further improve the compression ratio by co-compressing contiguous blocks. As a result, the SuperTag cache improves energy and performance for memory intensive applications over conventional compressed caches.

As described herein, aspects of the present invention provide a cache memory system comprising: a cache memory having a plurality of index addresses, wherein the cache memory stores a plurality of data segments at each index address; a tag memory array coupled to the cache memory and the plurality of index addresses, wherein the tag memory array stores a plurality of tag addresses at each index address with each tag address corresponding to a data block originating from a higher level of memory; and a back pointer array coupled to the cache memory, the tag memory array and the plurality of index addresses, wherein the back pointer array stores a plurality of back pointer entries at each index address with each back pointer entry corresponding to a data segment at an index address in the cache memory and each back pointer entry identifying a data block associated with a tag address in the tag memory array. The data blocks are compressed into one or more data segments.

In addition, each tag address may correspond to a plurality of data blocks originating from a higher level of memory.

A first data block may also be compressed with a second data block into one or more data segments, the first and second data blocks may be from the same plurality of data blocks corresponding to a tag address, and each back pointer entry may identify the tag address in the tag memory array.

Data segments compressed from a data block may be stored non-contiguously in the cache memory, a data block may be compressed using the C-PACK algorithm.

The cache memory may comprise the last level cache, or another level of cache.

The tag memory array may store the cache coherency state and/or the compression status for each data block. The tag memory array and the back pointer array may be accessed in parallel during a cache lookup. Each tag address may correspond, for example, to four contiguous data blocks. Each data block may be, for example, 64 Bytes in size, and each data segment may be, for example, 16 Bytes in size.

An alternative embodiment may provide a method for caching, data in a computer system comprising: (a) compressing a plurality of contiguous data blocks originating from a higher level of memory into a plurality of data segments; (b) storing the plurality of data segments at an index address in a cache memory; (c) storing a tag address in a tag memory array at the index address, the tag address corresponding to the plurality of contiguous data blocks originating from the higher level of memory; and (d) storing a plurality of back pointer entries in a back pointer array at the index address, each of the plurality of back pointer entries corresponding to a data segment at an index address in the cache memory and identifying a data block associated with a tag address in the tag memory array.

The method may further comprise compressing a first data block with a second data block into a plurality of data segments. Also, data segments compressed from a data block may be stored contiguously or non-contiguously in the cache memory, data blocks may be compressed using the C-PACK algorithm, for example, and the tag memory array may store the cache coherency state and/or compression status for each data block.

Another alternative embodiment may provide a computer system with a cache memory comprising: a data array having a plurality of data segments at a cache address; a back pointer array having a plurality of back pointer entries at the cache address, each back pointer entry corresponding to a data segment; a tag array having a plurality of group identification entries at the cache address, each group identification entry having a group identification number; and a cache controller in communication with the data array, the back pointer array, the tag array and a higher level of memory. The cache controller may operate to: (a) obtain from the higher level of memory a plurality of contiguous data blocks at a memory address, each of the plurality of contiguous data blocks receiving a sub-group identification number; (b) compress the plurality of data blocks into a plurality of data segments; (c) store the plurality of data segments in the data array at the cache address (d) store the memory address and the sub-group identification numbers in a group identification entry having a group identification number in the tag array; and (e) in each back pointer entry corresponding to a stored data segment, store the group and sub-group identification numbers corresponding to the data block from which the stored data segment was compressed.

The cache controller, may further operate to compress a first data block with a second data block into a plurality of data segments. Also, data segments may be stored contiguously or non-contiguously in the data array.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
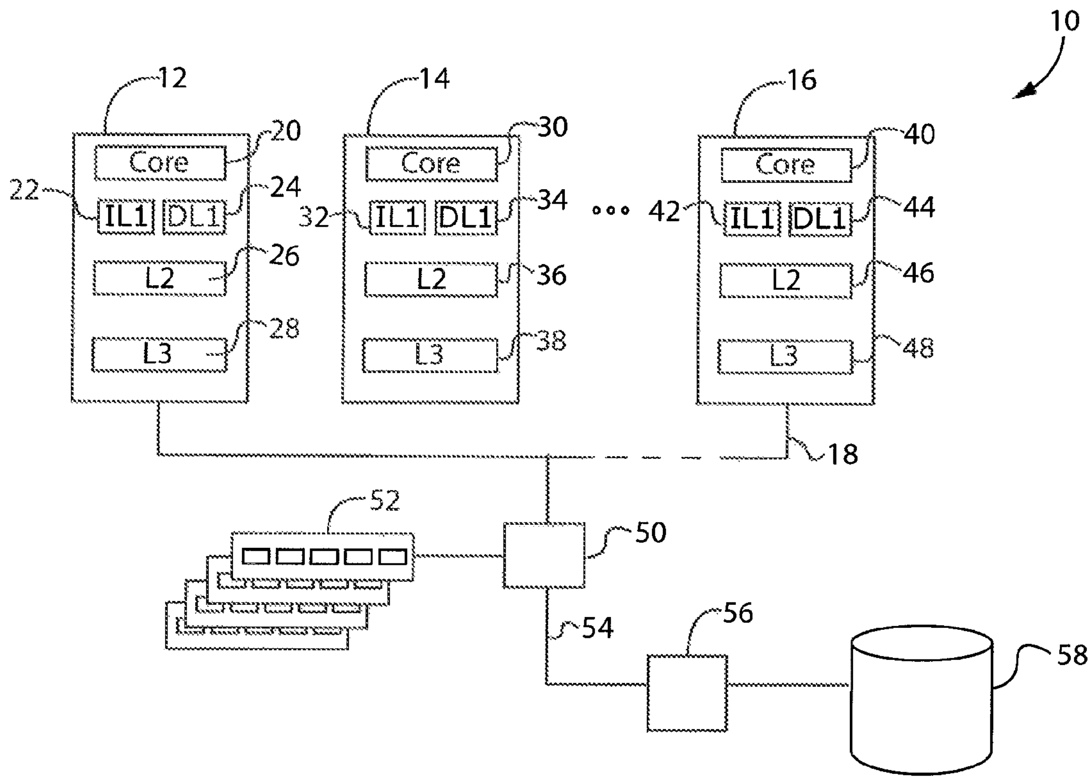
FIG. 1 is a logical diagram of a computer system in accordance with an embodiment of the present invention, including a plurality of processors and caches, a memory controller, a main memory and a mass storage device.

Referring now to the drawings wherein like reference numbers correspond to similar components throughout the several views and, specifically, referring to FIG. 1, the present invention shall be described in the context of a computer system 10 in accordance with an embodiment of the present invention. The computer system 10 includes one or more processors, such as processors 12, 14 and 16, coupled together on a common bus, switched interconnect or other interconnect 18. Additional processors may also be coupled together via the same bus, switched interconnect or other interconnect 18, or via additional buses or interconnects comprising additional nodes (not shown), as understood in the art.

Each processor, such as processor 12, further includes one or more processor cores 20 and a plurality of caches comprising a cache memory hierarchy. In alternative embodiments, one or more caches may be external to the processor/processor module, and/or one or more caches may be integrated with the one or more processor cores.

The plurality of, caches may include, at a first level, a Level 1 Instruction ("IL1") cache 22 and a Level 1 Data ("DL1") cache 24, each coupled in parallel to the processor cores 20. The IL1 cache 22 and DL1 cache 24 may each be, for example, private, 32 Kilobyte, 8-way associative caches with a 3-cycle hit latency. The plurality of caches may next include, at a second level, a larger Level 2 ("L2") cache 26 coupled to each of the IL1 cache 22 and DL1 cache 24, respectively, which, may be, for example, a private, 256 Kilobytes, single bank, 8-way associative cache with a 10-cycle hit latency. The plurality of caches may next include, at a third level, and perhaps last level, an even larger Level 3 ("L3") last level cache ("LLC") 28 coupled to the L2 cache 26. The last level cache 28 may be, for example, a shared, 8 Megabytes, divided into 8 banks, 16-way associative cache with a 17-cycle hit latency. The plurality of caches may implement, for example, the "MESI" protocol or any other protocol for maintaining cache coherency as understood in the art.

Each processor, in turn, couples via the bus, switched interconnect or other interconnect 18 to a memory controller 50. The memory controller 50 may communicate directly with the last level cache 28 in the processor 12, or in an alternative embodiment, indirectly with the last level cache 28 via the processor cores 20 in the processor 12. The memory controller 50 may then communicate with main memory 52, such as Dynamic Random Access Memory ("DRAM") modules 54, which may be, for example, 4 Gigabytes, divided into 16 banks, of Double Data Rate Type 3 ("DDR3") Synchronous DRAM ("SDRAM") operating at 800 MHz. The memory controller 50 may also communicate via one or more expansion buses 54 with more distant data containing devices, such as a mass storage device 58 (e.g., a hard disk drive, magnetic tape drive, optical disc drive, flash memory, etc.).

Figure 2:
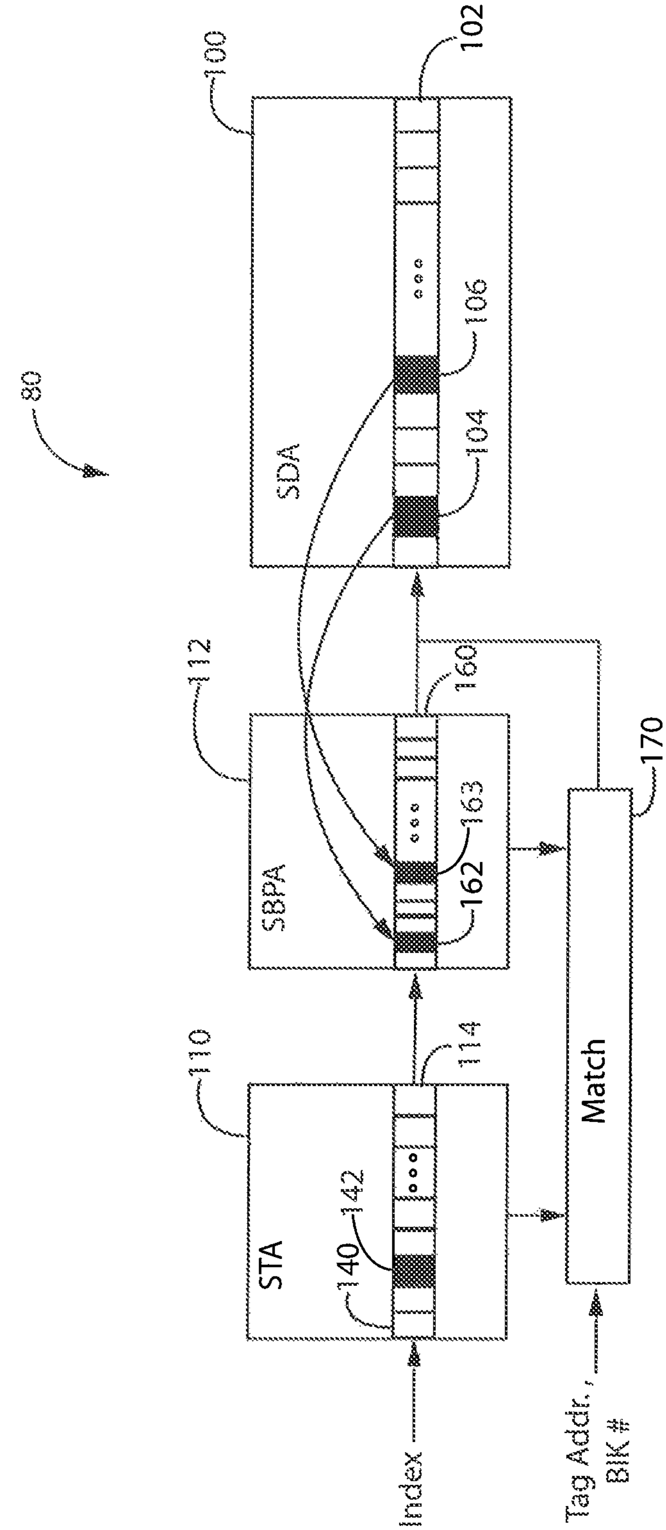
FIG. 2 is a SuperTag cache system in accordance with an embodiment of the present invention, including a super tag array, a segmented back pointer array and a segmented data array.

Referring now to FIG. 2, a SuperTag cache 80 in accordance with an embodiment of the present invention is shown. The SuperTag cache 80 may be implemented, for example, at the last level cache 28 as shown in FIG. 1. As will be described below, the SuperTag cache 80 provides a decoupled, segmented cache which may be managed at three granularities: coarse grain, multi-block "super blocks," such as every four blocks of 64 Bytes each, via a super tag memory array 110, (ii) single cache blocks, such as individual 64 Byte blocks, and (iii) fine grain, fractional block "data segments," such as at 16 Byte data segments, via a segmented back, pointer array 112. SuperTag cache 80 explicitly tracks super blocks and data segments, while it implicitly tracks single cache blocks by storing them as a plurality of data segments.

In alternative embodiments, the sizes of super blocks, cache blocks and data segments may vary. For example, another embodiment may provide larger size super blocks, such as every eight blocks of 128 Bytes each, and/or smaller data segments, such as 8 Byte data segments. This might improve compression ratio, for example, but at the cost of additional area and power overheads. In yet another embodiment, the super block may comprise a single block which may incur more area and power, but provide increased performance.

Figure 3:
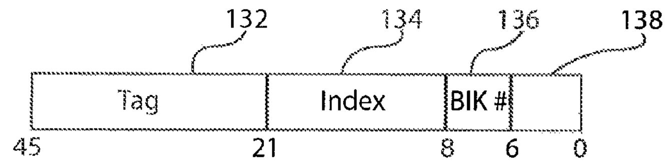
FIG. 3 is a depiction of the fields for mapping and indexing the cache system of FIG. 2.

Referring briefly to FIG. 3, a depiction of the fields for mapping and indexing the cache system in accordance with an embodiment of the present invention is shown. The SuperTag cache 80 maps super blocks to locations in the higher level of memory via a tag address field 132. The SuperTag cache 80 also indexes cached data via an index field 134, a block number field 136 and an offset field 138. The sizes of each bit field may vary according to the cache architecture and addressing schemes. For example, in an embodiment comprising super blocks consisting of four contiguous blocks, the block number field 136 may comprise only 2 bits for uniquely identifying each of the four contiguous blocks.

Referring back to FIG. 2, the SuperTag cache 80 explicitly tracks super blocks in the super tag array 110, and also breaks each cache block into smaller data segments 104 that are dynamically allocated in a cache memory or segmented data array 100. In this way, it can exploit the spatial similarities among multiple blocks while it does not incur the internal fragmentation and false sharing overheads of large blocks.

Unlike conventional caches, the SuperTag cache 80 does not require data segments 104 of a cache block to be stored adjacently. The SuperTag cache 80 stores data segments 104 in-order, but not necessarily contiguously. For example, data segments 104 and 106 may originate from the same cache block while being stored non-contiguously. As such, the SuperTag cache 80 does not require repacking cache sets to make contiguous space, and as a result, eliminates compaction overheads while keeping the benefits of variable-size compressed cache blocks.

In addition to separately compressing cache blocks into variable sizes, to further improve compression ratio, the SuperTag cache 80 may further exploit spatial locality by co-compressing cache blocks, including within a super block. In other words, a first data block may be compressed with a second data block, or with a second and a third data block, etc., including within the same super block, to produce one or more data segments.

The SuperTag cache 80 organizes data space by data segments in a cache memory comprised of a segmented data array 100. For example, for the 16-way last level cache 28 described above, there may be 64 data segments in each set, such as exemplar data set 102 having individual data segments numbered from 0 to 63. With cache blocks of 64 Bytes in size, multiple data segments may be divided into 16 Bytes in size each, such as exemplar data segments 104 and 106, and stored in order, but not necessarily contiguously, within the data set. In this way, each data set can store, for example, up to 16 uncompressed blocks, or up to 64 compressed blocks.

To track cache blocks at both coarse and fine granularities, a super tag array ("STA") 110, which tracks coarse grain, multi-block super blocks, and a segmented back-pointer array ("SBPA"), which tracks fine grain, data segments, are both used. The super tag array 110 and the segmented back-pointer array 112 may be accessed in parallel on a cache lookup, and in serial with the segmented data array 100.

The main source of area overheads in the SuperTag cache 80 may be the back pointer array which tracks each data segment assignment. However, an alternative embodiment may provide, for example, limiting how segments are assigned to blocks by using a hybrid packing technique, such as fixing the assignment at super block boundaries.

Figure 4:
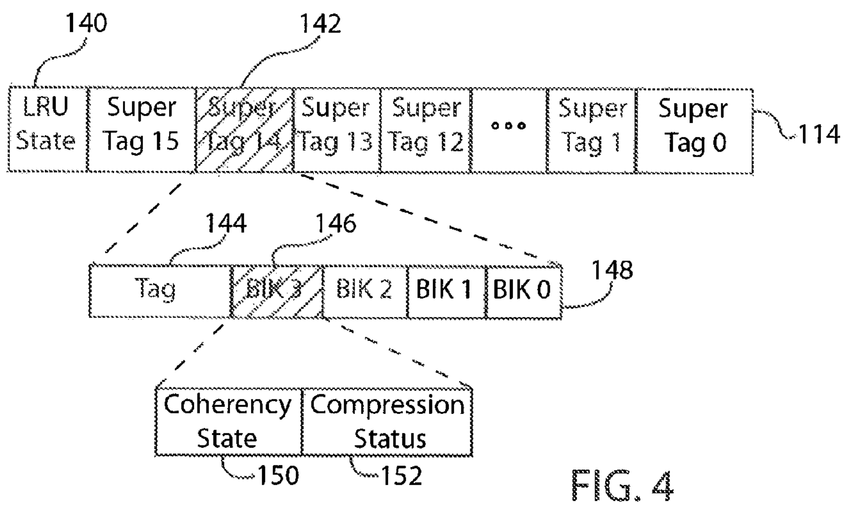
FIG. 4 is a depiction of an exemplar super tag set from the super tag array of the cache system of FIG. 2.

Referring briefly to FIG. 4, a depiction of an exemplar super tag set 114 of the super tag array 110 is shown. The exemplar super tag set 114 may include a least recently used ("LRU") field 140 for implementing a cache replacement policy. Each super tag entry within the super tag set, such as exemplar super tag entry 142, shares one tag address 144 for each of the related blocks within the super block, such as exemplar block 146 ("Block 3"). Each of the related blocks within the super block stores per-block information separately, such as the cache coherency state 150 and optionally the compression status 152 for the block. For example, as shown in FIG. 4, the super tag array 110 is tracking for "SuperTag 14," "Blk 3" the tag address, the cache coherency state and the compression status for that block.

Figure 5:
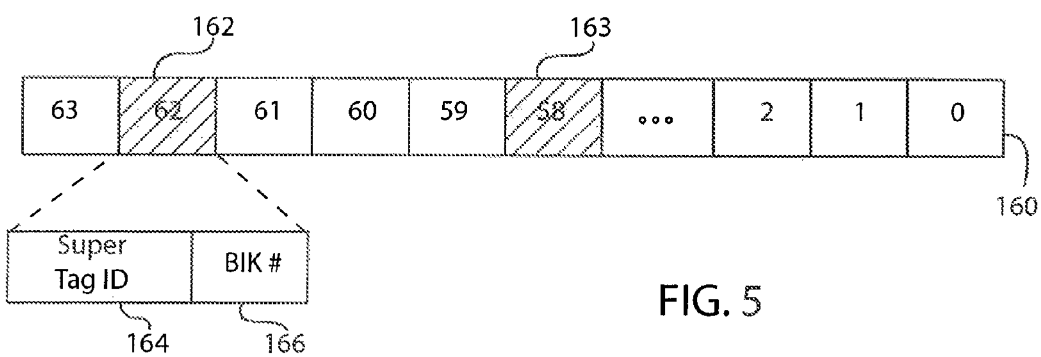
FIG. 5 is a depiction of an exemplar segmented back-pointer set from the segmented back pointer array of the cache system of FIG. 2.

Referring back to FIG. 2, since the SuperTag cache 80 does not store segments of a cache block in contiguous space, it uses the segmented back-pointer array 112 to resolve which block each data segment in the segmented data array 100 refers. Referring briefly to FIG. 5, a depiction of an exemplar segmented back-pointer entry set 160 of the segmented back pointer array 112 is shown. The exemplar segmented back-pointer entry set 160 includes sixty-four back-pointer entries in, the set, individually numbered from 0 to 63, and corresponding to the same number data segment in the corresponding data set in the segmented data array 100. Each back pointer entry within the back-pointer set, such as exemplar back pointer entry 162, stores the super tag number and the block number being tracked. For example, referring to FIGS. 2-5, for at a particular tag address and index, back-pointer entries "58" and "62" correspond to segmented data entries "58" and "62" in the segmented data array 100, and are tracking data for "SuperTag 14," "Blk 3."

Referring back to FIG. 2, during a cache lookup, both the super tag array 110 and the segmented back-pointer array 112 may be accessed in parallel. In the case of a cache hit, both the block and its corresponding super block are found available, meaning, for example, the SuperTag cache 80 has matched 170 a super tag entry 142, and the block's 146 coherency state 150 shows that it is valid. In this case, using the corresponding exemplar back pointer entries 162 and 163 from the back pointer entry set 160, corresponding exemplar data segments 104 and 106 from the data set 102 in the segmented data array 100 may be accessed.

Figure 6A:
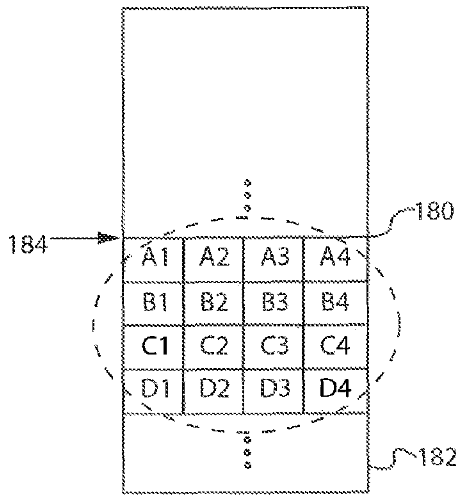
FIGS. 6A-D depict a multi-block super block that is variable-packed, co-compressed and dynamically stored in cache in accordance with an embodiment of the present invention.
Figure 6B:
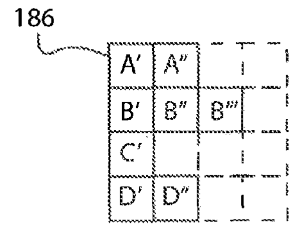

Referring now to FIG. 6A-D, a multi-block super block that is variable-packed, co-compressed and dynamically stored in cache in accordance with an embodiment of the present invention is shown. Referring to FIG. 6A, a multi-block super block 180 stored in a main memory 182, beginning at a particular address 184, may include contiguous blocks "A," "B," "C" and "D," each block 64 Bytes in size and divisible into 16 Byte segments. Referring to FIG. 6B, each block within the super block 180 may be individually compressed into fewer 16 Byte data segments 186. For example, the 64 Byte block "A," comprised of four 16 Byte segments "A1," "A2," "A3" and "A4," may be compressed into two 16 Byte data segments, A' and "A''," Similarly, the 64 Byte block "B," comprised of four 16 Byte segments "B1," "B2," "B3" and "B4," may be compressed into two 16 Byte data segments, "B'" and "B''," and so forth. A C-PACK pattern-based partial dictionary compression algorithm, for example, which has low hardware overheads, may be used in a preferred embodiment.

Figure 6C:
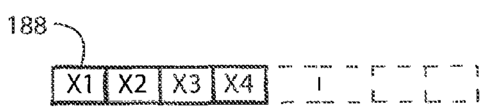

Alternatively, referring to FIG. 6C, blocks of the super block 180 may be co-compressed together, including within the super block, into fewer 16 Byte co-compressed data segments 188. For example, blocks "A," "B," "C" and "D," a 256 Byte super block, may be co-compressed as a whole into four 16 Byte data segments, "X1," "X2," "X3" and "X4." Alternatively, block "A" may be co-compressed with block "B" and block "C" may be co-compressed with block "D," or any other similar arrangement may be made.

Co-compression on larger scales may advantageously improve the compression ratio. Co-compression includes providing one or more compressors and de-compressors. A single compressor/de-compressor may be used to compress and decompress blocks serially, however, this may reduce compression benefits by increasing cache hit latency. In a preferred embodiment, a plurality of compressors/de-compressors may be used in parallel, such as four compressors and, de-compressors for super blocks comprising four cache blocks. In this manner, co-compression would not incur additional latency overhead. This is particularly the case given the typically low area and energy overheads of compressor/de-compressor units, thereby incurring low overhead.

In an alternative embodiment, the SuperTag cache may consistently use co-compression for every block within a super block as a whole, and thereby avoid tracking individual block numbers in the segmented back pointer array.

Figure 6D:
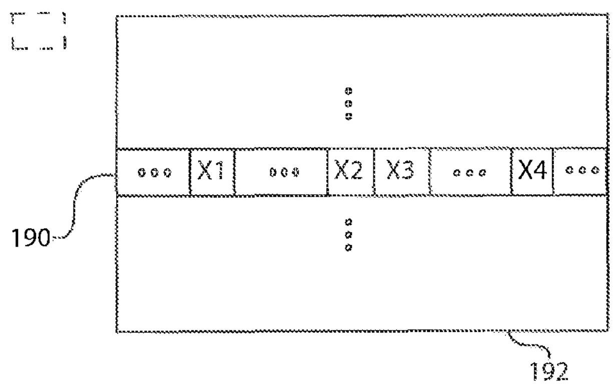

Referring to FIG. 6D, the co-compressed 16 Byte data segments 188 may, in turn, be dynamically stored in order in a data set 190 in a segmented data array 192. Alternatively, however, the individually compressed 16 Byte data segments 186 may, in turn, be dynamically stored in order in the data set 190 in the segmented data array 192 (not shown). The 16 Byte data segments 186 or 188 need not be stored contiguously, however, due to the utilization of corresponding back pointer entries by the SuperTag cache.

Figure 7:
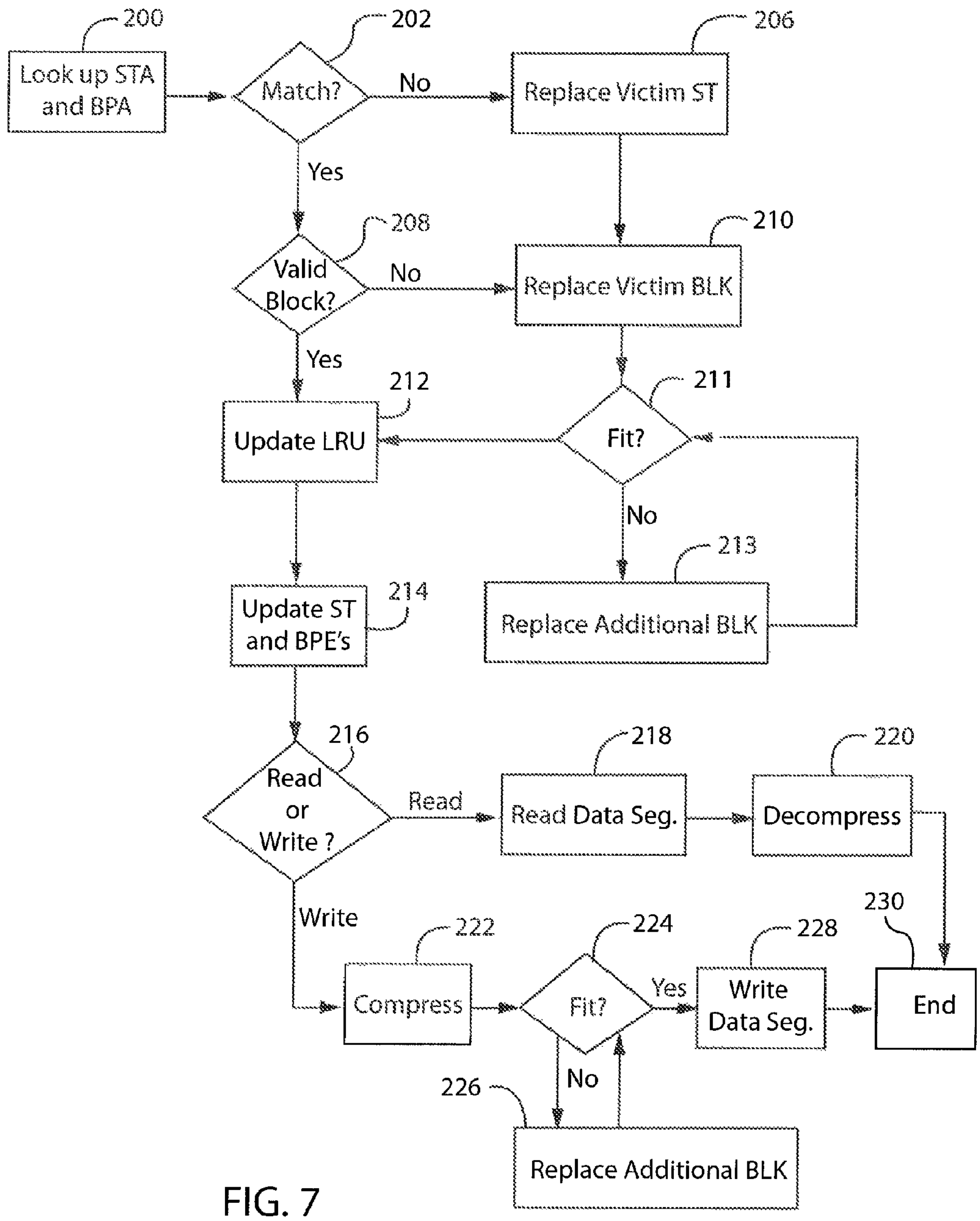
FIG. 7 is a flow chart illustrating the operation of a SuperTag cache system in accordance with an embodiment of the present invention.

Referring now to FIG. 7, a flow chart illustrating the operation of a SuperTag cache system in accordance with another embodiment of the present invention is shown. In step 200, during a cache lookup for a particular block, both a super tag array and a segmented back-pointer array may be accessed in parallel using a cache index. In decision step 202, a matching super block, or cache hit, using the index address, tag address and block number is determined. If no matching super block is found in decision step 202, a victim super block may be selected for replacement in step 206, for example, based on an LRU replacement policy, and data may be retrieved from higher in the memory hierarchy, such as from main memory in an embodiment implemented in the last level cache. As such, a victim block may then be replaced with the data being sought in step 210. Then, in decision step 211, it is determined if the replacement block will fit in the data array. If the replacement block does not fit, in step 213 an additional block may be replaced, then the system may return to decision step 211 to repeat as necessary. If, however, the replacement block does fit, the system may then update the LRU field in step 212 accordingly.

However, if a matching super block is found in decision step 202, the validity, or cache coherency state, for the block within the super block is then determined in decision step 208 to ensure that the block is valid. If the block is found to be invalid, then the victim block within the super block may be replaced with the data being sought in step 210, then it may be determined if the replacement block will fit in decision step 211, and if the replacement block does not fit, an additional block may be replaced in step 213, repeating as necessary. Then, the system may update the LRU field in step 212 accordingly. Alternatively, if the block is found to be valid in step 208, then the LRU field may then be directly updated in step 212 without any replacement activity occurring.

Next, in step 214, the corresponding super tags and back pointer entries may be accessed and/or updated accordingly. Then, if decision step 216 indicates a read operation, the corresponding data segments are read in step 218 and then decompressed in step 220 before the cycle ends at step 230. Alternatively, if decision step 216 indicates a write operation, the data segments are compressed in step 222, and in decision step 224, it is determined if the data segments will fit in the data array. If the data segments will not fit, in step 226 an additional block may be replaced, then the system may return to decision step 224 to repeat as necessary. If, however, the data segments will fit, the data segments are written in step 228 before the cycle ends at step 230. The cycle may repeat, or cycles may perform in parallel, for each cache lookup.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A cache memory system comprising:

a cache memory storing a plurality of data segments, wherein the data segments are compressed from a multi-block including contiguous data blocks originating from a higher level of memory;

a tag, memory array coupled to the cache memory, wherein the tag memory array stores a plurality of tag addresses with each tag address corresponding to a multi-block originating from the higher level of memory; and a back pointer array coupled to the cache memory and the tag memory array, wherein the back pointer array stores a plurality of back pointer entries with each back pointer entry corresponding to a data segment in the cache memory and each back pointer entry identifying a multi-block associated with a tag address in the tag memory array and a data block of the multi-block compressed to form the data segment;

wherein the data segments are stored non-contiguously in the cache memory.

2. The cache memory of claim 1, wherein each tag address corresponds to four data blocks originating from the higher level of memory.

3. The cache memory of claim 2, wherein a first data block is compressed with a second data block into one or more data segments.

4. The cache memory of claim 3, wherein the first and second data blocks are from the same plurality of data blocks corresponding to a tag address.

5. The cache memory of claim 2, further comprising each back pointer entry identifying a tag address in the tag memory array.

6. The cache memory of claim 1, wherein four data segments compressed from four data blocks are stored non-contiguously in the cache memory.

7. The cache memory of claim 1, wherein a data block is compressed using the C-PACK algorithm.

8. The cache memory of claim 1, wherein the cache memory is a last level cache.

9. The cache memory of claim 1, wherein the tag memory array stores a cache coherency state for each data block.

10. The cache memory of claim 1, wherein the tag memory array stores a compression status for each data block.

11. The cache memory of claim 1, wherein the tag memory array and the back pointer array are accessed in parallel during a cache lookup.

12. The cache memory of claim 1, wherein each tag address corresponds to four contiguous data blocks.

13. A method for caching data in a computer system comprising:

(a) compressing a plurality of contiguous data blocks originating from a higher level of memory into a plurality of data segments, the plurality of contiguous data blocks being a multi-block;

(b) storing the plurality of data segments in a cache memory, the data segments being stored non-contiguously in the cache memo;

(c) storing a tag address in a tag memory array, the tag address corresponding to the multi-block originating from the higher level of memory; and (d) storing a plurality of back pointer entries in a back pointer array, each of the plurality of back pointer entries corresponding to a data segment in the cache memory and a multi-block identifying a data block compressed to form the data segment, the multi-block being associated with a tag address in the tag memory array.

14. The method of claim 13, further comprising compressing a first data block with a second data block into a plurality of data segments.

15. The method of claim 13, further comprising compressing four data blocks to form four data segments, and storing the four data segments non-contiguously in the cache memory.

16. The method of claim 13, further comprising compressing data blocks using the C-PACK algorithm.

17. The method of claim 13, further comprising storing a cache coherency state for each data block in the tag memory array.

18. A computer system with a cache memory comprising:

a data array having a plurality of data segments;

a back pointer array having a plurality of back pointer entries, each back pointer entry corresponding to a data segment;

a tag array having a plurality of group identification entries, each group identification entry having a group identification number; and a cache controller in communication with the data array, the back pointer array, the tag array and a higher level of memory, wherein the cache controller operates to:

(a) obtain from the higher level of memory a plurality of contiguous data blocks at a memory address, each of the plurality of contiguous data blocks receiving a sub-group identification number;

(b) compress the plurality of contiguous data blocks into a plurality of data segments;

(c) store the plurality of data segments in the data array, the data segments being stored non-contiguously in the data memory;

(d) store the memory address and the sub-group identification numbers in a group identification entry having a group identification number in the tag array; and (e) in each back pointer entry corresponding to a stored data segment, store the group identification number and the sub-group identification numbers corresponding to the data block from which the stored data segment was compressed.

19. The computer system of claim 18, wherein the cache controller further operates to compress a first data block with a second data block into a plurality of data segments.

20. The computer system of claim 18, wherein four data segments compressed from four data blocks are stored non-contiguously in the data array.

* * * * *